Figure 1:
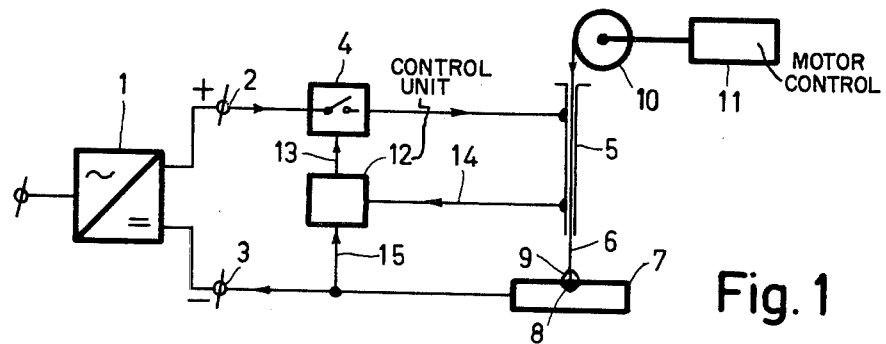

United States Patent [19]

Pijls et al.

[11] 4,020,320

[45] Apr. 26, 1977

[54] SHORT-CIRCUIT ARC WELDING WITH CONSTANT BEADS

[75] Inventors: Hermanus Stephanus Josephus Pijls; Elias Put, both of Eindhoven, Netherlands

[73] Assignee: U.S. Philips Corporation, New York, N.Y.

[22] Filed: Jan. 21, 1975

[21] Appl. No.: 542,840

[30] Foreign Application Priority Data

Feb. 8, 1974 Netherlands .............. 741723

[52] U.S. Cl. .................. 219/137 PS; 219/131 F
[51] Int. Cl.² ........................... B23K 9/10
[58] Field of Search ... 219/137 PS, 131 R, 131 WR, 219/131 F, 135

[56] References Cited

UNITED STATES PATENTS

| | | | |
|---|---|---|---|
| 3,423,564 | 1/1969 | Sevenco | 219/131 R |
| 3,459,920 | 8/1969 | Sevenco | 219/131 R |
| 3,627,975 | 12/1971 | Goto | 219/131 F |
| 3,792,225 | 2/1974 | Needham et al. | 219/131 R |
| 3,809,853 | 5/1974 | Manz | 219/131 F |

Primary Examiner—J. V. Truhe
Assistant Examiner—Clifford C. Shaw
Attorney, Agent, or Firm—Frank R. Trifari; Bernard Franzblau

[57] ABSTRACT

In short circuit arc welding there are many parameters which influence the automatically controlled welding procedure, but which frequently may affect the quality of the weld. In some circumstances the welding bead which is formed does not flow in to the molten pool of the workpiece, but disintegrates into many small drops around the weld owing to an excessive short-circuit current.

The invention proposes methods and arrangements in which certain parameters, such as arc time and a short-circuit current delay time are controlled or maintained constant, so that always a constant bead size is assured owing to a constant power, after which said bead of constant size is first partly introduced into the molten pool and subsequently the short-circuit current for separation is applied.

6 Claims, 6 Drawing Figures

SHORT-CIRCUIT ARC WELDING WITH CONSTANT BEADS

The invention relates to methods of and arrangements for short-circuit arc welding of the type including at least one power source for the welding current and a welding wire which is fed from a reel and via a welding wire guide to a workpiece to be welded.

In U.S. Pat. No. 2,886,696 an arc welding method is proposed in which welding material in the form of a welding wire is continuously fed to a workpiece. Between the workpiece and the welding wire a welding source is connected which provides electrical power for melting the workpiece surface and the welding wire. By a suitable selection of voltage and current in the welding circuit and of the wire feed rate, the welding wire melts off in the form of beads which are taken up by the molten pool produced at the workpiece surface. Thus, a regular cycle is obtained of arc ignition, bead formation, short-circuit between bead and molten pool, and a short-circuit current which separates the bead from the solid portion of the welding wire, after which another arc ignition takes place. Depending on the various welding parameters, the cycle time, the arc time and the short-circuit time may be variable because the welding process adapts itself automatically to changed conditions within certain limits. A drawback associated with this known welding method is that the bead size has nearly always changed after the aforesaid automatic adaptation of the welding process. In an extreme case in which the arc power is high, the molten pool may become comparatively large and the beads assume substantial dimensions at a comparatively great distance from the molten pool. The bead then may disintegrate upon the subsequent short-circuit into a multitude of small beads which spatter onto the workpiece surface. In order to eliminate said spatter effect, U.S. Pat. No. 3,275,797 provides a spatter reducing control unit which is included in the welding circuit. This control unit limits the short-circuit current to a value smaller than the arc current.

The invention is based on the insight that per-cycle arc short-circuit, first of all a bead of substantially constant dimensions should be formed and that said bead should be taken up sufficiently far in the molten pool before a short-circuit current may appear, of which one function, as already known, is to interrupt the contact between bead and welding wire.

A method according to the invention is therefore characterized in that for a duration $T_b$ an arc is maintained between welding wire and workpiece in which a substantially constant power is developed and a welding bead of substantially constant dimensions is produced at the welding wire, after which the welding bead during a time $T_w$ is transferred to the molten Pool in the workpiece owing to the continued welding wire drive, and that the short-circuit current for separation of the bead and wire is applied after a constant time delay $T_d$ following the instant of short-circuiting.

In this respect it is advantageous that per cycle always the same amount of material melts off the welding wire and that no substantial spatter effects occur, while the properties of the automatic adjustment of the welding process in the case of changing parameters are still maintained.

A further elaboration of the method according to the invention is characterized in that the arc is supplied for a constant time $T_b$ from a first power supply source with a no-load voltage higher than the arc voltage and with a current-source characteristic, and that the short-circuit current is mainly supplied by a second supply source with a voltage lower than the arc voltage and with a lower internal impedance.

An advantage of said method is that the constant arc power is simply obtained by employing a welding source with falling characteristic which, owing to a relatively high impedance, has the character of a current source so that in combination with the assumption that the arc voltage is substantially constant during said process, a constant arc power $E_b \cdot I_b$ is obtained. It consequently suffices to keep the time interval $T_b$, in which the arc is permissable, constant in order to maintain the arc power per bead substantially constant as a product of the arc voltage $E_b$, the arc current $I_b$ and the time $T_b$.

Another supply source having a voltage lower than the arc voltage may be employed to furnish the short-circuit current. Said method has the advantage that it can be realised with simple means.

In the said methods according to the invention the presence of an arc voltage between welding wire and workpiece can be detected advantageously in order to determine the time $T_b$ and the presence of a low voltage, the short-circuit voltage, may be employed to determine the instant of short-circuiting between bead and molten pool.

In the arrangements embodying the methods it may be advantageous to employ controllable semiconductor switches in the welding current circuit which are controlled by a control unit for defining the said time intervals $T_b$ and $T_d$.

The use of silicon-controlled rectifiers is then preferred. In a first preferred embodiment of an arrangement according to the invention the first supply source is a current source and the second source a voltage source. This embodiment is characterized in that the first supply source has a positive terminal connected directly, and the second supply source has a positive terminal connected via two anti parallel silicon-controlled rectifiers, used as welding current switches, to the welding wire. A negative terminal of each supply source is connected to the workpiece. The control unit per arc/short-circuit cycle first turns on the one silicon-controlled rectifier so that the arc is extinguished and the second supply source draws current and after the time interval $T_w + T_d$ turns on the other silicon-controlled rectifier for supplying the short-circuit current.

A second embodiment is characterized in that the first supply source has a positive terminal connected to the welding wire via a first silicon-controlled rectifier, that the second supply source has a positive terminal connected to the positive terminal of the first supply source by means of a parallel-connection of a second silicon-controlled rectifier and a diode of mutually opposite polarity, and that the control unit per arc/short-circuit cycle after the time interval $T_b$ turns on the second silicon-controlled rectifier and after a time interval $T_w + T_d$ turns on the first silicon-controlled rectifier.

Both arrangements advantageously utilise the lower voltage of the second supply source to automatically turn off the silicon-controlled rectifiers at the correct instant without the use of intricate commutation circuitry. Thus, the control unit can be very simple and may for example consist of two Schmitt triggers and 2 monostables, as in another preferred embodiment of an arrangement according to the invention, which is characterized in that the control unit is connected to the welding wire and the workpiece with one input, and which furthermore comprises a first Schmitt trigger circuit, which is connected to the input and which has a trigger level which is lower than the arc voltage, a first monostable multivibrator circuit, which is connected to the first Schmitt trigger circuit and to a control input of a controllable semiconductor switch and which determines the time interval $T_b$, a second Schmitt trigger circuit, which is connected to the input and which has a trigger level which is substantially lower than the arc voltage, but higher than the short-circuit voltage, and a second monostable multivibrator circuit, which is connected to the second Schmitt trigger circuit and to a control input of a controllable semiconductor switch and which determines the time interval $T_d$.

Figure 2:
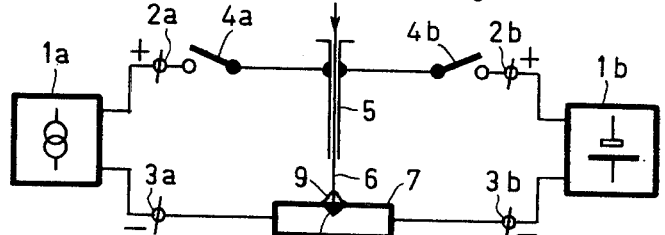
Figure 3:
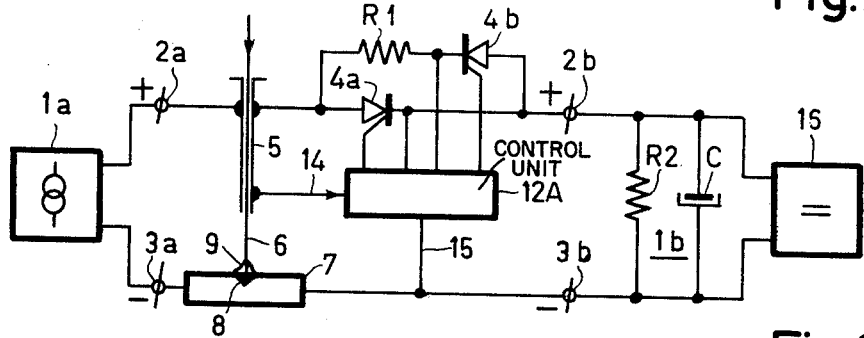
Figure 4:
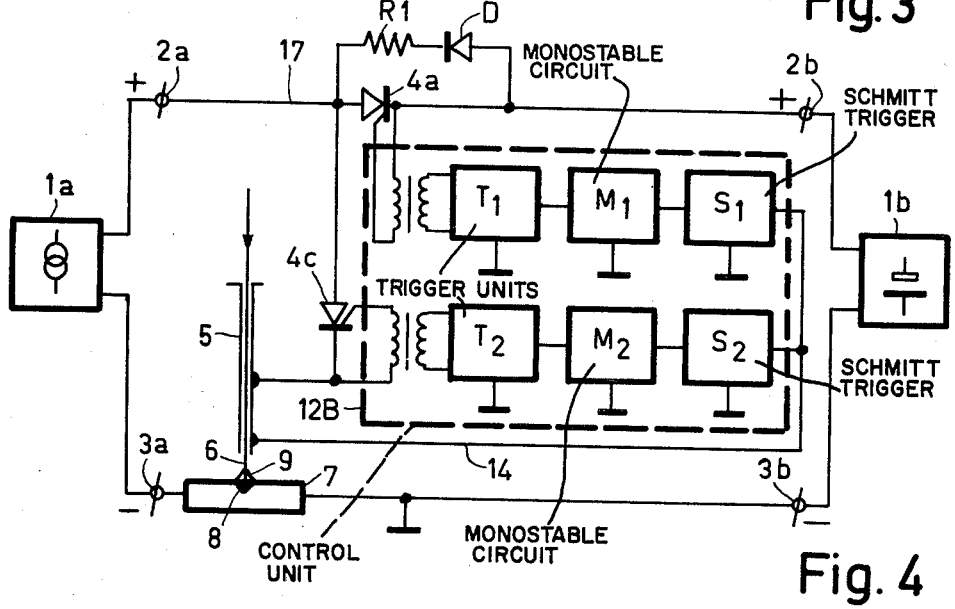
Figure 5:
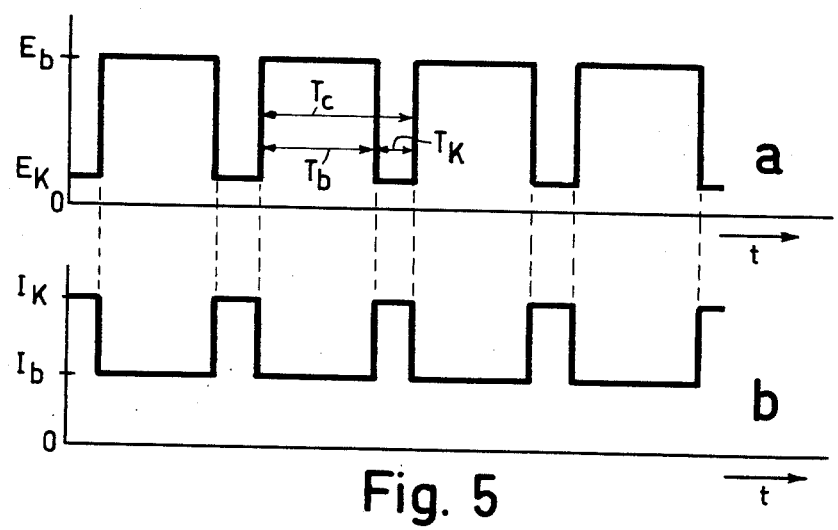
Figure 6:
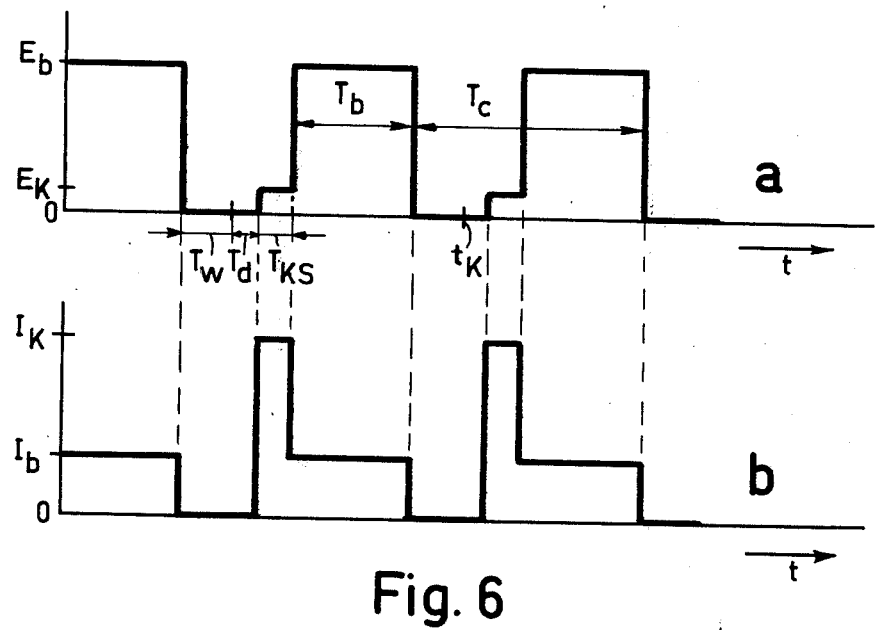

The invention will be described in more detail with reference to the drawing, in which:

FIG. 1 represents a block diagram in explanation of the method according to the invention, FIG. 2 shows another block diagram of an arrangement according to the invention, FIG. 3 shows an arrangement according to the invention, FIG. 4 shows an arrangement according to the invention provided with a control unit, FIG. 5 is a diagram of welding voltages and currents in a known arrangement, and FIG. 6 is a diagram of welding voltages and currents obtained with the method according to the invention.

FIG. 1 schematically shows an arrangement which embodies the method according to the invention. A supply source 1, via terminals 2 and 3 and a switching unit 4, supplies the welding current to a welding wire guide 5, which contains a welding wire 6, for a welded joint to a workpiece 7. The welding current varies in accordance with a regular cycle which consists of an arc current interval and a short-circuit current interval. The heat developed by said currents produces a molten zone 8 in the workpiece, the molten pool, and causes the welding wire 6 to melt off in the zone 9. Said welding wire is fed through the welding wire guide 5 from a reel 10 which is driven by a motor control unit 11. A control unit 12 supplies control signals via a connection 13 to a switching unit 4 for controlling the welding current, inter alia in dependence on measuring signals method which are received via connections 14 and 15 to the welding circuit.

The operation is as follows: The control unit 12 switches the unit 4 so that a sufficiently high voltage exists between welding wire 6 and workpiece 7 to sustain an arc in the zone 9, the welding wire 6 approaching the workpiece 7. The arc voltage $E_b$ and the arc current $I_b$ can be measured and the arc duration $T_b$ is determined in the unit 12 in such a way that the product of the three parameters is constant, though adjustable if required. The power which is developed is consequently constant. In the case of a correct setting, the molten pool 8 is heated by said power, but moreover a bead of welding material is formed at the welding wire, which always assumes the same size in an arc period of the sequence arc/ short-circuit/arc associated with the process. Subsequently, the arc is extinguished by the switching unit 4 interrupting the welding circuit. The bead is transferred to the molten pool as a result of the speed with which the welding wire 6 is fed in. Once there is contact, and after a dwell time $T_{tc}$, said instant of short circuiting is measured by unit 12 and after a delay $T_d$, which begins at the said instant, the switching unit 4 is switched by the control unit 12 so that from the source 1 in the welding circuit, a short-circuit current begins to flow, which produces so much heat in the zone 9 that the bead melts off the welding wire, and again an arc is obtained between welding wire and molten pool. After this the process just outlined is repeated. Thus, each time a bead of constant dimensions is brought into the molten pool, after which it is separated.

It will be evident that said controlled short-circuit arc cycle yields a more uniform weld of better quality under varying conditions. Specifically, the occurrence of spatter is substantially eliminated.

In FIG. 2 similar parts of the block diagram of FIG. 1 are shown with the same reference numerals. The supply source 1 is divided into a source 1a with a current-source characteristic and with a voltage which is higher than the arc voltage in the zone 9, and into a source 1b with a voltage lower than the arc voltage and with a lower internal impedance.

In FIG. 2 the switching unit 4, which in FIG. 1 has a programming function to switch the correct voltages and currents on and off, is simplified to the switch 4a and the switch 4b. Said switches are represented as mechanical switches, but are preferably controllable semiconductor switches. Since, according to the invention, the arc power during a cycle should be constant, it is advantageous to employ the source 1a because the product of $E_b$ and $I_b$ is then already constant. A switch 4a need now only be closed during a constant time interval $T_b$. This greatly simplifies the control function of the control unit 12 of FIG. 1. The supply source 1b supplies the short-circuit current by the closure of the switch 4b. The voltage from said source may be substantially lower than the arc voltage because only the short-circuit voltage between welding wire 6 and workpiece 7 must be overcome.

FIG. 3 shows a practical embodiment of the arrangement of FIG. 2, silicon-controlled rectifiers 4a and 4b being employed as switches. The supply source 1a may be a simple welding source with a rectifier circuit and selfinductances to obtain the falling characteristic of the current source circuit. An annoying property of this type of welding source is that the source is slow owing to the self-inductances and cannot readily be switched on and off, while nevertheless a more or less constant arc current must be obtained. Furthermore, it is known that silicon-controlled rectifiers cannot be turned off in the case of inductive loads, unless special steps are taken. Despite said drawbacks, the circuit of FIG. 3 excels in respect of simplicity. The source 1a is directly and permanently connected to the welding wire 6 and workpiece 7. The arc current switch 4a is included in the lead from the welding wire guide 5 to the supply source 1b.

As soon as an arc voltage exists owing to the presence of the arc in zone 9, this condition is measured, via line 14, in control unit 12A and, for example, a timing circuit is started which determines the time interval $T_b$. After said interval, the silicon-controlled switch 4a is triggered and connects the source 1b to the welding wire guide. The voltage of source 1b is lower than the arc voltage, while the arc supply source 1a has a high internal impedance so that the arc will have to extinguish. The current from source 1a now flows via thyristor 4a into the supply source 1b, which thus consumes said current. As said source may consist of a line transformer with a rectifier, which cannot drain current, it is necessary to include a resistor $R_2$ and, as the case may be, a buffer capacitor C. Via line 14 the control unit 12A detects the short-circuit, which in the mean time has occurred between welding wire 6 and molten pool 8 and starts a timing circuit in the control unit which defines the time interval $T_d$. After said interval has elapsed the silicon-controlled switch 4b is triggered, which is connected in antiparallel with silicon-controlled rectifier 4a. During the delay time $T_d$ the current from supply source 1a passes through the short circuit in zone 9 owing to said short-circuit. The short-circuit voltage is lower than the supply voltage of source 1b so that silicon-controlled rectifier 4a can be turned off. However, owing to silicon-controlled rectifier 4b being driven into conduction, after which a short-circuit current from the source 1b will flow through zone 9, the extinction of silicon-controlled rectifier 4a is promoted. Moreover, the bead melts off the welding wire 6 so that the short-circuit between welding wire and workpiece is interrupted. The voltage between them now increases until an arc is struck whose voltage is higher than the voltage of source 1b, so that silicon-controlled rectifier 4b will be turned off. The cycle is then repeated. In order to limit the short circuit current it may be necessary to include a resistor $R_1$ in series with silicon-controlled rectifier 4b.

FIG. 4 shows the arrangement of FIG. 3, the silicon-controlled rectifier 4b being replaced by a diode D and a silicon-controlled rectifier 4c being included between the welding wire guide and the positive supply line 17 of source 1a, which remains connected to the silicon-controlled rectifier 4a and the diode D. Said arrangement thus makes it possible to have no current from source 1a in the short-circuit zone during the delay time $T_d$. The silicon-controlled rectifier 4c is then cut off and the silicon-controlled rectifier 4a remains conducting to supply the current from source 1a to source 1b. When the wire 6 contacts workpiece 7 a short-circuit occurs thereby connecting line 14 to ground potential. This is measured on line 14 and owing to the low voltage triggers a Schmitt trigger $S_2$ in control unit 12B. As a result, a monostable circuit $M_2$ is started, which after a time interval $T_d$ returns to the stable state and thus provides a trigger pulse to a trigger unit $T_2$, which via an isolating transformer supplies trigger pulses to the silicon-controlled rectifier 4c. As the voltage on line 17 equals the voltage of source 1b, the silicon-controlled rectifier 4c will be turned on and reduce the voltage on line 17 to the short-circuit voltage. As a result, the current from source 1a flows through the silicon-controlled rectifier 4c, the diode D is turned on again and the silicon-controlled rectifier 4a is not turned on. From source 1b the short-circuit current is now obtained, which after a short-circuit time $T_{ks}$ interrupts the connection between welding wire 6 and workpiece 7 so that the voltage on line 17 again increases to the arc voltage. Consequently, silicon-controlled rectifier 4c remains conductive. The presence of the arc voltage is measured via line 14 and the threshold of Schmitt trigger $S_1$ in control unit 12B is exceeded. Said Schmitt trigger triggers the monostable circuit $M_1$ which after a time interval $T_b$ supplies a control signal to the trigger unit $T_1$, after which silicon-controlled rectifier 4a is turned on via a transformer of unit $T_1$. The voltage on line 17 drops below the arc voltage and decreases to the voltage of source 1b so that the arc in zone 9 is extinguished and silicon-controlled rectifier 4c is no longer conducting and is turned off. This is followed by the dwell time $T_w$, the short-circuit and the adjustment of the delay time $T_d$ after which the cycle is repeated.

To illustrate this FIG. 5 shows the voltage and current of a known non-controlled short-circuit arc-welding arrangement. The diagram $a$ shows the voltage between welding wire and workpiece as a function of time. The voltage alternately assumes the value $E_b$ of the arc voltage during a time $T_b$ and the value $E_k$ of the short-circuit voltage during the time $T_k$. The voltage waveforms shown are stylized to squarewaves. The diagram $b$ of FIG. 5 represents the arc current $I_b$ and short-circuit current $I_k$ corresponding to diagram $a$. The cycle time $T_c = T_b + T_k$, in which both $T_b$ and $T_k$ may vary depending on various influences which may affect the welding process.

FIG. 6 shows the corresponding diagrams of FIG. 5 in the case where a method according to the invention is employed. The arc time $T_b$ is, for example, maintained constant. This is followed by a dwell time $T_w$, which may be variable, and subsequently by the instant of short-circuiting $T_k$, which is detected, so that a constant delay time $T_d$ occurs, after which a short-circuit current $I_k$ flows during a time interval $T_{ks}$, which may be variable. The cycle time $T_c$ can thus change, owing to $T_w$ and $T_{ks}$ being varied, for example, due to adaptations to external changes in the welding process parameters (supply voltage variations, welding wire feed-rate variations).

Owing to the uniform beads and the delayed application of the separating short-circuit current, after the bead has already been fed partially into the molten pool, a better weld is obtained in spite of changing welding parameters, such as the influence of the operator, supply voltage variations or wire feed-rate variations.

What is claimed is:

1. A method of short-circuit arc welding using at least one electric supply source for the arc current and a consumable welding wire which method comprises, applying an electric voltage between the welding wire and a workpiece by means of the supply source while feeding the welding wire towards the workpiece during a first time interval $T_b$ so that an electric arc is sustained between the welding wire and workpiece of substantially constant power thereby to develop a welding bead of substantially constant size, removing the energy supplied to the welding wire and workpiece while feeding the welding wire towards the workpiece during a second time interval $T_w$ until the welding bead contacts the workpiece to produce a short-circuit, providing a constant delay time $T_d$ following the moment of contact between the welding bead and workpiece, and applying a short-circuit current across the welding wire and workpiece at the end of said delay time so as to separate the welding bead from the welding wire.

2. A method as claimed in claim 1 wherein the arc is supplied during a constant time interval $T_b$ which is the same for successive arc-welding cycles of the welding operation and from a first electric supply source having a no-load voltage which is higher than the arc voltage and having a current-source characteristic, and the short-circuit current is mainly supplied by a second supply source having a voltage which is lower than the arc voltage and a low internal impedance.

3. A method as claimed in claim 1 comprising the further steps of measuring the presence of arc voltage between welding wire and workpiece for determining the time interval $T_b$ and measuring the presence of a voltage which is substantially lower than the arc voltage for determining the moment of short-circuiting.

4. A short-circuit arc welding apparatus comprising, electric supply source means for supplying welding current between a consumable welding wire and a workpiece, means for feeding the welding wire towards the workpiece, means including said supply source means for applying a voltage between the welding wire and workpiece during a first time interval $T_b$ so as to produce a constant power electric arc between the welding wire and workpiece during said first time interval thereby to develop a welding bead of constant size on the welding wire, detector means responsive to the electric condition of the arc gap between welding wire and workpiece for producing first and second control signals indicating the presence of an arc condition and a short-circuit condition, respectively, in said gap, switching means for controlling the supply of electric energy from said supply source means to the welding wire and workpiece, and a control unit controlled by said detector means and including means for developing and supplying further control signals to said switching means for determining the first time interval $T_b$ and a second constant time interval $T_d$ that begins at the moment of contact between the welding bead and the workpiece and which is indicative of a short-circuit condition therebetween, the control unit supplying a third control signal at the end of the second time interval for operating the switching means to apply a short-circuit current from the supply source means across the welding wire and workpiece so as to separate the welding bead from the welding wire, and wherein said supply source means comprises first and second DC supply sources, said switching means including means connecting the positive terminal of the first supply source to the welding wire by means of a first silicon-controlled rectifier and the positive terminal of the second supply source to the positive terminal of the first supply source by means of a parallel connection of a second silicon-controlled rectifier and a diode of mutually opposite polarity, the control unit being operative after the time interval $T_b$ to turn on the second silicon-controlled rectifier and after the second time interval $T_d$ turns on the first silicon-controlled rectifier.

5. A short-circuit arc welding apparatus comprising, electric supply source means for supplying welding current between a consumable welding wire and a workpiece, means for feeding the welding wire towards the workpiece, means including said supply source means for applying a voltage between the welding wire and workpiece during a first time interval $T_b$ so as to produce a constant power electric arc between the welding wire and workpiece during said first time interval thereby to develop a welding bead of constant size on the welding wire, detector means responsive to the electric condition of the arc gap between welding wire and workpiece for producing first and second control signals indicating the presence of an arc condition and a short-circit condition, respectively, in said gap, switching means for controlling the supply of electric energy from said supply source means to the welding wire and workpiece, and a control unit controlled by said detector means and including means for developing and supplying further control signals to said switching means for determining the first time interval $T_b$ and a second constant time interval $T_d$ that begins at the moment of contact between the welding bead and the workpiece and which is indicative of a short-circuit condition therebetween, the control unit supplying a third control signal at the end of the second time interval for operating the switching means to apply a short-circuit current from the supply source means across the welding wire and workpiece so as to separate the welding bead from the welding wire, and wherein the control unit is connected to the welding wire and the workpiece with one input, and furthermore comprises a first Schmitt trigger circuit which is connected to the input and which has a trigger level which is lower than the arc voltage, a first monostable multivibrator circuit connected to the first Schmitt trigger circuit and to a control input of a controllable semiconductor switch and which determines the time interval $T_b$, a second Schmitt trigger circuit which is connected to the input and which has a trigger level which is substantially lower than the arc voltage, but higher than the short-circuit voltage, and a second monostable multivibrator circuit connected to the second Schmitt trigger circuit and to a control input of a controllable semiconductor switch and which determines the time interval $T_d$.

6. A short-circuit arc welding apparatus comprising, electric supply source means for supplying welding current between a consumable welding wire and a workpice, means for feeding the welding wire towards the workpiece, detector means responsive to the electric condition of the arc gap between welding wire and workpiece for producing first and second control signals indicating the presence of an arc condition and a short-circuit condition, respectively, in said gap, switching means for controlling the supply of electric energy from said supply source means to the welding wire and workpiece, said supply source means comprising first and second DC supply sources, means connecting the positive terminal of the first supply source directly to the welding wire for applying a voltage between the welding wire and workpiece during a first time interval $T_b$ so as to produce a constant power electric arc between the welding wire and workpiece during said first time interval thereby to develop a welding bead of constant size on the welding wire, means connecting the positive terminal of the second supply source to the welding wire via two silicon-controlled rectifiers which are a part of said switching means and are connected in anti-parallel and which function as welding current switches, means connecting a negative terminal of each supply source to the workpiece, and a control unit controlled by said detector means and including means for developing and supplying further control signals to said switching means for determining the first time interval $T_b$ and a second constant time interval $T_d$ that begins at the moment of contact between the welding bead and the workpiece and which is indicative of a short-circuit condition therebetween, the control unit being operative to first turn on one silicon-controlled rectifier so that the arc is extinguished and the second supply source consumes the current, the control unit supplying a third control signal at the end of the second time interval $T_d$ for turning on the other silicon-controlled rectifier to apply a short-circuit current from the second DC supply source across the welding wire and workpiece so as to separate the welding bead from the welding wire.

* * * * *

UNITED STATES PATENT AND TRADEMARK OFFICE
CERTIFICATE OF CORRECTION

PATENT NO. : 4,020,320
DATED : April 26, 1977
INVENTOR(S) : HERMANUS STEPHANUS JOSEPHUS PIJLS ET AL It is certified that error appears in the above-identified patent and that said Letters Patent are hereby corrected as shown below:

IN THE TITLE PAGE

Section [30] "741723" should be --7401723--.

Col. 3, line 48, "method" should be deleted.

Signed and Sealed this

Thirteenth Day of December 1977

[SEAL]

Attest:

RUTH C. MASON
Attesting Officer

LUTRELLE F. PARKER
Acting Commissioner of Patents and Trademarks